United States Patent
Balbale et al.

(10) Patent No.: US 7,375,620 B2
(45) Date of Patent: May 20, 2008

(54) SPEED-SENSITIVE REAR OBSTACLE DETECTION AND AVOIDANCE SYSTEM

(75) Inventors: Uzmaa H. Balbale, Canton, MI (US); Pamela I. Labuhn, Shelby Township, MI (US); Charles A. Green, Canton, MI (US); Osman D. Altan, Northville, MI (US); William J. Chundrlik, Jr., Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 194 days.

(21) Appl. No.: 11/297,694

(22) Filed: Dec. 8, 2005

(65) Prior Publication Data

US 2007/0132563 A1 Jun. 14, 2007

(51) Int. Cl.
*B60Q 1/00* (2006.01)
*G01C 9/00* (2006.01)

(52) U.S. Cl. ...................... 340/435; 702/150
(58) Field of Classification Search ........ 340/435, 340/932.2, 466; 702/150, 85, 48; 342/71; 701/301, 159; 370/467; 345/71; 900/300
See application file for complete search history.

(56) References Cited

U.S. PATENT DOCUMENTS

| | | | |
|---|---|---|---|
| 5,635,922 A * | 6/1997 | Cho et al. ............... | 340/903 |
| 6,594,614 B2 * | 7/2003 | Studt et al. ............. | 702/150 |
| 7,027,920 B2 | 4/2006 | Madau | |
| 2005/0107955 A1 * | 5/2005 | Isaji et al. .............. | 701/301 |
| 2006/0250224 A1 * | 11/2006 | Steffel et al. ........... | 340/435 |

* cited by examiner

*Primary Examiner*—Davetta W. Goins
*Assistant Examiner*—Sigmund Tang

(57) ABSTRACT

A rear obstacle detection and avoidance system for use on a vehicle comprises a rear obstacle detector that is coupled to the vehicle and measures the distance between the vehicle and an obstacle substantially to the vehicle's rear, a speed sensor that determines vehicle speed, an alert generator that notifies an occupant of the vehicle of a rear obstacle, and a processor that is coupled to the rear obstacle detector, the speed sensor, and the alert generator. The processor causes the generation of a first alert when the vehicle's speed is less than a threshold speed and the distance between the vehicle and an obstacle substantially to the vehicle's rear is less than a first distance determined in accordance with a first function of speed vs. distance. Additionally, the processor causes the generation of a second alert when the vehicle's speed is greater than the threshold speed and the distance between the vehicle and an obstacle substantially to the vehicle's rear is less than a second distance determined in accordance with second function of speed vs. distance.

19 Claims, 6 Drawing Sheets

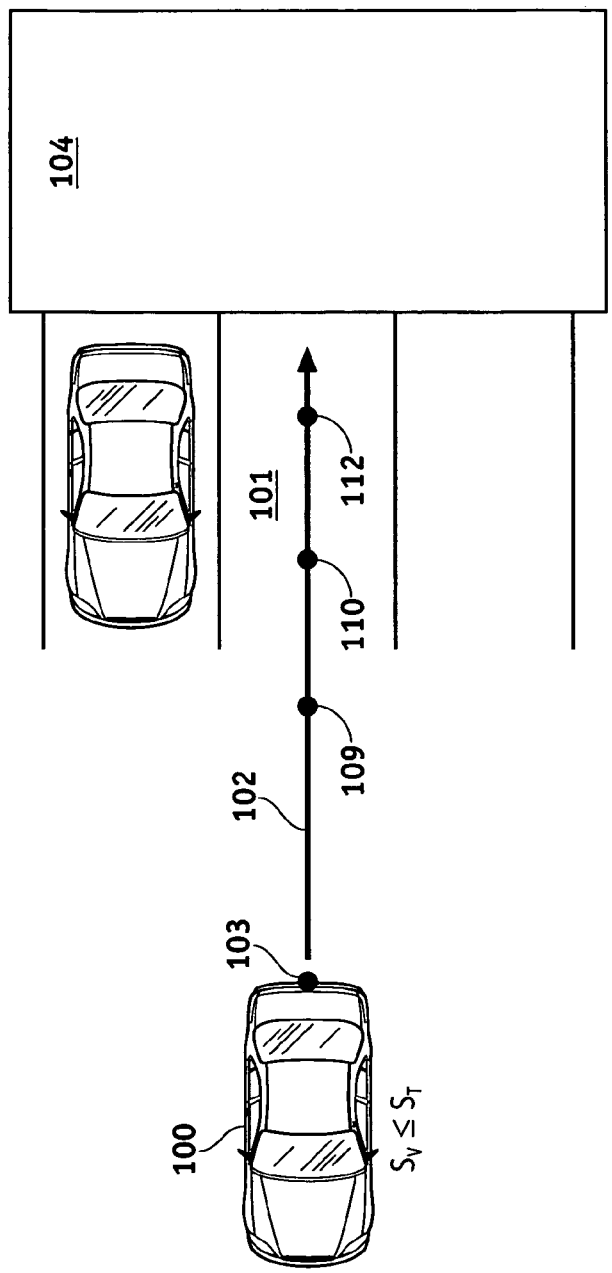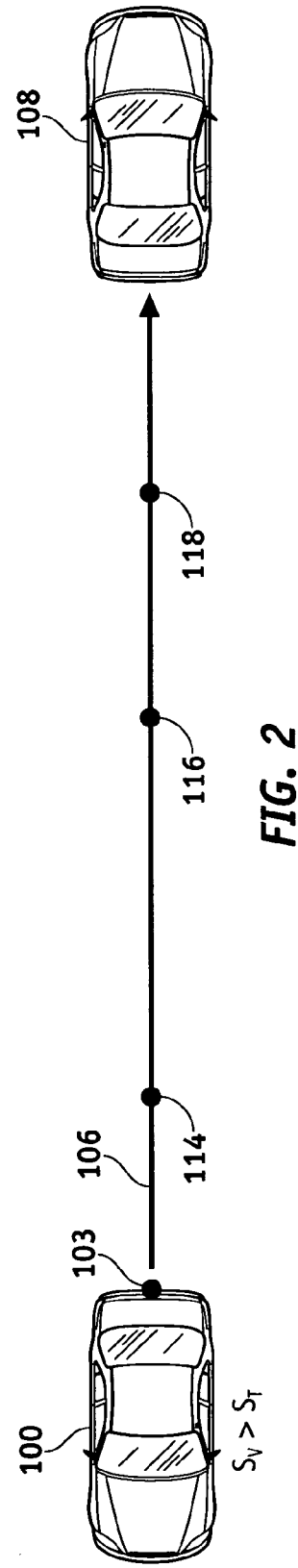

SPEED-SENSITIVE REAR OBSTACLE DETECTION AND AVOIDANCE SYSTEM

TECHNICAL FIELD

The present invention relates generally to a vehicular rear obstacle detection and avoidance system and, more particularly, to a rear obstacle detection and avoidance system configured to notify a driver of a vehicle of rear obstacles and the likelihood of collision therewith over a range of speeds and distances.

BACKGROUND OF THE INVENTION

In most circumstances, the driver of a vehicle (e.g., a car, truck, SUV, etc.) has adequate visibility to permit the safe operation of his or her vehicle. Indeed, a driver's ability to see areas to the vehicle's rear is typically enhanced through the well-known use of interior and exterior rearview mirrors. Despite this, however, drivers commonly encounter situations in which their ability to see the vehicle's path and obstacles within the vehicle's path is handicapped, especially when operating the vehicle in reverse (e.g., when backing into a parking space).

A variety of rear obstacle avoidance (ROA) systems have been developed that alert a driver to obstacles near or within the vehicle's projected rearward path and thereby minimize the likelihood of collision. One known type provides the driver with a more complete view of the vehicle's rearward path. For example, an ROA system of this type may be configured to tilt the vehicle's external rearview mirrors downward when the vehicle is operating in reverse and a rear obstacle is detected (a "curb view" function). Alternatively, ROA systems may permit a driver to view images in the vehicle's rearward path captured by a rear-facing camera via a monitor mounted in the vehicle's cabin.

Another known type of rear obstacle detection and avoidance system minimizes the likelihood of a rear obstacle collision in a more active way; i.e., by detection and notification. For example, ROA systems may employ a camera and one or more sensors (e.g., infrared, ultrasonic, or radar sensors, or any combination thereof) that monitor the vehicle's rearward path and alert the driver to any obstacles detected therein by producing audible and visual alerts. Such ROA systems may vary the alerts generated in relation to the distance between a detected obstacle and the vehicle (i.e., the detected distance); e.g., the system may generate one audible beep per second when the detected distance is greater than two meters, two beeps per second when the detected distance is between one and two meters, and three beeps per second when the detected distance is less than one meter. Unfortunately, while ROA systems of this type are generally satisfactory when performing relatively low speed reverse maneuvers (e.g., parking), they typically do not provide the driver with adequate warning when the vehicle is traveling in reverse at greater speeds (e.g., when the vehicle is being driven in reverse to back out of an alley or long driveway). Furthermore, some drivers may have difficulty reacting quickly enough to avoid a collision with a detected rear obstacle even when their vehicle is operating at a relatively slow speed.

Considering the above, it should be appreciated that it would be desirable to provide a rear obstacle detection and avoidance system configured to effectively alert a driver of a rear obstacle and the likelihood of collision therewith during both low speed and higher speed reverse maneuvers. In addition, it should be appreciated that it would be desirable for such a system to automatically disengage the throttle and apply the appropriate amount of braking force immediately prior to a rear obstacle collision. Furthermore, other desirable features and functions of the present invention will become apparent from the subsequent detailed description of the invention and the appended claims, taken in conjunction with the accompanying drawings and this background of the invention.

SUMMARY OF THE INVENTION

A rear obstacle detection and avoidance system for use on a vehicle that comprises a rear obstacle detector that is coupled to the vehicle and measures the distance between the vehicle and an obstacle substantially to the vehicle's rear. A speed sensor determines vehicle speed, and an alert generator notifies an occupant of the vehicle of the presence of a rear obstacle. A processor that is coupled to the rear obstacle detector, the speed sensor, and the alert generator causes the generation of a first alert when the vehicle's speed is less than a threshold speed and the distance is less than a first distance determined in accordance with a first function of speed vs. distance. Additionally, the processor causes the generation of a second alert when the vehicle's speed is greater than the threshold speed and the distance is less than a second distance determined in accordance with a second function of speed vs. distance.

A method for detecting and avoiding an obstacle behind a vehicle when the vehicle is being operated in reverse comprises the step of detecting the distance between the obstacle and the rear of the vehicle. A first alert is generated when the speed of the vehicle is less than a threshold speed and the distance between the obstacle and the rear of the vehicle is less than a first distance determined in accordance with a first function of speed vs. distance. A second alert is generated when the speed of the vehicle is greater than a threshold speed and the distance between the obstacle and the rear of the vehicle is less than a second distance determined in accordance with a second function of speed vs. distance.

DESCRIPTION OF THE DRAWINGS

The present invention will hereinafter be described in conjunction with the following drawing figures, wherein like numerals denote like elements, and:

FIGS. 1 and 2 are top views illustrating a vehicle equipped with the inventive rear obstacle detection and avoidance system traveling in reverse at relatively low and relatively moderate rates of speed, respectively;

DESCRIPTION OF AN EXEMPLARY EMBODIMENT

Figure 3:
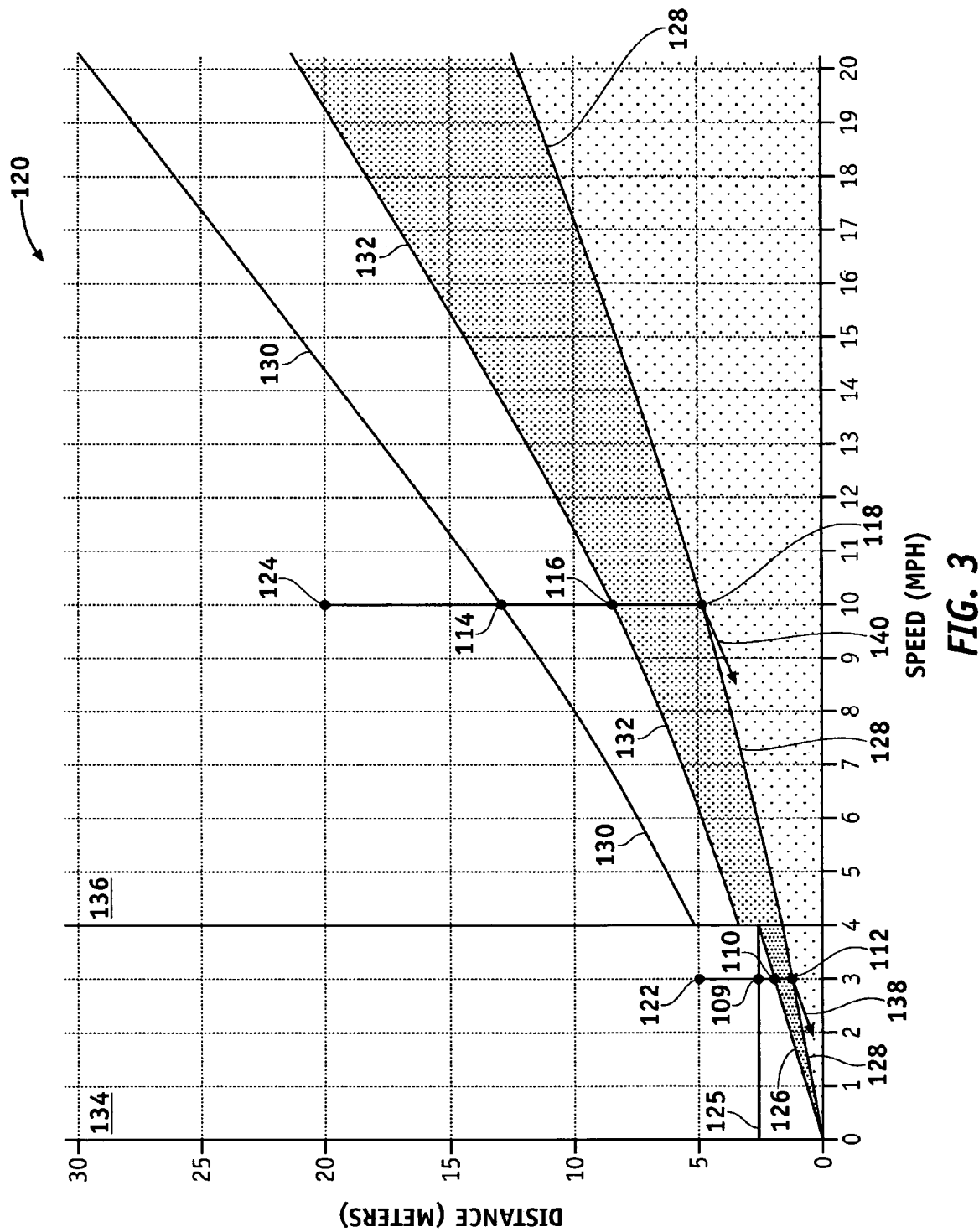
FIG. 3 is a graph which shows the relationship between speed in miles per hour (x-axis) and distance in meters (y-axis) and illustrates three speed vs. distance functions below and three speed vs. distance functions above a predetermined threshold speed.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

FIGS. 1 and 2 are overhead views of a vehicle 100 equipped with an exemplary embodiment of the inventive rear obstacle detection and avoidance (ROA) system. In FIGS. 1 and 2, vehicle 100 is shown as performing a low speed reverse maneuver and a higher speed reverse maneuver, respectively. More specifically, vehicle 100 is illustrated in FIG. 1 as attempting to back into a parking space 101 at a speed ($S_V$) that is less than or equal to a predetermined threshold speed ($S_T$) (e.g., 4 mph) along path 102 without contacting rear obstacle 104 (e.g., a building). In FIG. 2, vehicle 100 is driving in reverse at a speed greater than the threshold speed ($S_T$) along path 106 and is approaching rear obstacle 108 (e.g., another vehicle). In accordance with the present invention, the ROA system may operate in either of at least two modes: a low speed mode (commonly referred to as a "parking assist" mode) appropriate for monitoring low speed reverse maneuvers such as that illustrated in FIG. 1, and a higher speed mode appropriate for monitoring higher speed reverse maneuvers such as that illustrated in FIG. 2. As will be seen, however, some or all of the rear obstacle avoidance actions taken by the ROA system when operating within either of these modes may be speed dependent.

Vehicle 100 is equipped with a rear obstacle detector 103 for monitoring a specified detection field behind the vehicle by, for example, transmitting pulses (e.g., infrared, ultrasonic, or radar) and receiving pulses reflected back from rear obstacles. Rear obstacle detector 103 should be of a type capable of monitoring objects relatively close to (e.g., within one meter) and relatively far away from (e.g., thirty or more meters behind) vehicle 100 to achieve proper operation during low speed and higher speed reverse maneuvers. The rear obstacle detector may comprise both ultrasonic and radar sensors, or the detector may comprise solely radar sensors capable of producing a relatively deep detection field while simultaneously accurately detecting obstacles that are relatively close to the rear of the vehicle. A suitable radar detector may be purchased from M/A COM, Inc., a division of Tyco Electronics, located in Lowell, Mass.

The points at which the ROA system will perform various rear obstacle avoidance actions when vehicle 100 is traveling at a particular and constant speed ($S_V$) are represented by nodes 109, 110, and 112 on path 102 in FIG. 1 and by nodes 114, 116, and 118 on path 106 in FIG. 2. Referring first to FIG. 1, first, second, and third avoidance actions will be performed by the inventive ROA system when the vehicle reaches the positions represented by respective nodes 109, 110, 112 and is traveling at a constant speed $S_V$ (e.g., 3 mph), which is less than predetermined threshold speed $S_T$. It should be appreciated that these ROA actions may be performed continuously or until another set of conditions is fulfilled that results in discontinuation of the ROA action. For example, in FIG. 1, if vehicle 100 approaches obstacle 104 at a speed of 3 mph, the ROA system may be configured to issue a cautionary alert at node 109, which may include a visual alert (e.g., a flashing yellow light generated by a display mounted proximate the vehicle's rear windshield) and an audible alert (e.g., a brief chime-like tone). The audible alert may sound only once while the visual alert may continue until vehicle 100 reaches node 110. At this point an imminent alert may be generated, the imminent alert possibly consisting of a new visual alert (e.g., a flashing red light also appearing on the display mounted proximate the vehicle's rear windshield), a new audible alert (e.g., a repeating chime-like tone), and/or a haptic alert (e.g., a seat vibration or a brief application of the brake, referred to as a brake pulse, which may be felt by the driver and other passengers). Lastly, when vehicle 100 reaches node 112, the ROA system may automatically apply an appropriate degree of braking force to prevent a collision with obstacle 104. The manner in which such an automatic braking function may be implemented is described in greater detail hereinbelow.

Referring now to FIG. 2, it can be seen that at least first, second, and third rear obstacle avoidance actions may be performed at nodes 114, 116, and 118, respectively, when vehicle 100 is traveling along path 106 at a speed (e.g., 10 mph) greater than threshold speed $S_T$. The ROA system may be configured, for example, to issue a cautionary alert and an imminent alert (similar to those described in the above paragraph) at nodes 114 and 116, respectively. Furthermore, the inventive ROA system may be configured to disengage the throttle and apply sufficient braking to prevent a collision with obstacle 108 when vehicle 100 reaches node 118 as will be more fully described subsequently. It should be clear that FIGS. 1 and 2 and the description thereof are only examples of warning and avoidance schemes that may be utilized in the low speed (parking assist) mode and a higher speed mode, respectively. The inventive detection and avoidance system is clearly capable of performing a variety of warning and avoidance protocols to suit a variety of situations and embodiments.

FIG. 3 is a graph of speed vs. distance that is useful to further describe how collision avoidance actions are selected and implemented as a function of speed versus distance in relation to an obstacle substantially behind vehicle 100. Graph 120 illustrates four functions 126, 128, 130 and 132 corresponding to four speed vs. distance characteristics. Additionally, graph 120 illustrates a fifth speed vs. distance function 125. In this case, function 125 is a predetermined distance threshold. In FIG. 3, specifically, function 125 is held at a constant distance of 2.5 meters for all speeds in the low speed range. It should be appreciated, however, that the configuration of speed vs. distance functions shown in FIG. 3 is illustrative only.

As can be seen in FIG. 3, functions 125, 126, 130, and 132 do not span the entire speed range of graph 200. Functions 125 and 126 appear only in the low speed range 134 (i.e., 0-4 mph), and functions 130 and 132 appear only in the higher speed range 136 (i.e., greater than or equal to 4 mph) because the functions contained within low speed range 134 are particularly adapted for low speed reverse maneuvers, while the functions contained within higher speed range 136 are particularly adapted for higher speed reverse maneuvers. If desired, the low speed functions may be similar to those employed in known parking assist systems, such as the Ultrasonic Rear Parking Assist system developed by General Motors Corporation. It should be understood that the threshold speed of 4 mph is given by way of example only, and other thresholds may be utilized. To avoid flutter between actions occurring at the threshold speed, it may be desirable to incorporate hysteresis in the switching protocol between the higher speed range and the low speed range. For example, while the transition from a low speed range to the higher speed range occurs at approximately 4 mph, the transition from the higher speed range to the low speed range may occur at approximately 3.5 mph.

It should be appreciated that the low speed maneuver shown and described in connection with FIG. 1 substantially corresponds to the low speed parking maneuver as indicated by nodes 109, 110, 112, and 122 in FIG. 3. Referring to FIGS. 1 and 3, vehicle 100 begins the parking maneuver at about five meters away from obstacle 104 as indicated by node 122. Under these initial conditions, the ROA system may not perform any rear obstacle avoidance actions. ROA actions may first be performed when vehicle 100 moves backwards approximately 2.5 meters such that 2.5 meters separate vehicle 100 from obstacle 104 (node 109 on function 125). As the distance separating vehicle 100 from obstacle 104 (i.e., the detected distance) is equivalent to or less than the predefined distance represented by function 125 at this point, the ROA system may perform one or more initial rear obstacle avoidance actions. For example, the ROA system may issue a cautionary alert in the manner described previously. In addition, the ROA system may begin displaying the distance between vehicle 100 and obstacle 104 on a rear display mounted proximate the rear windshield or a driver control interface display mounted proximate the driver's instrument control panel. This distance may be related to the driver by displaying the number of meters separating the vehicle from the obstacle, by displaying one or more indicator lights (e.g., by displaying one light when the distance is 3 meters, two lights when the distance is 2 meters, and 3 lights when the distance is one meter, etc.), or by any other suitable means.

Next, when vehicle 100 backs-up a further one-half meter such that the detected distance is approximately two meters (node 110 on function 126), the ROA system may issue an imminent alert. As described previously, this alert may comprise a visual alert and/or an audible alert. This alert may also include a haptic alert (e.g., a brake pulse). However, in the embodiment described in conjunction with FIG. 3, it may be preferable to only issue a haptic alert in the higher speed range 136 described subsequently; given the closeness of functions 110 and 112, generating a brake pulse or other haptic alert in low speed range 134 may not provide a driver with an adequate amount of time to react to the alert generated at function 110 before avoidance actions (e.g., automatic braking) are performed at function 112.

Finally, if and when vehicle 100 moves backwards another meter such that only about one meter separates vehicle 100 from obstacle 104 (node 112 on function 128), the ROA system may take actions to prevent an imminent collision with obstacle 104. For example, the ROA system may apply an appropriate degree of automatic braking (indicated in FIG. 3 by arrow 138 of maneuver 122) to stop vehicle 100 before a rear obstacle collision occurs. Automatic braking is described in greater detail below in conjunction with FIGS. 4-8.

The maneuver shown in FIG. 2 corresponds to the backing maneuver indicated by nodes 114, 116, 118, and 124 in FIG. 3. Referring to FIGS. 2 and 3, the exemplary backing maneuver begins when vehicle 100 is about 20 meters from obstacle 108 (node 124). When vehicle 100 backs-up about 7 meters leaving a distance of about 13 meters between the vehicle and obstacle (node 114 on function 130), the ROA system issues a cautionary alert in the manner described previously. As vehicle 100 continues to move backwards until approximately 8 meters separate vehicle 100 from obstacle 108 (node 116 on function 132), the ROA system issues an imminent alert, possibly including a haptic alert (e.g., a brake pulse), as described previously. Finally, when the distance separating vehicle 100 from obstacle 108 is about 5 meters (node 118 on function 128), the ROA system automatically applies an appropriate degree of braking force to stop the vehicle prior to collision as is indicated by arrow 140.

Figure 4:
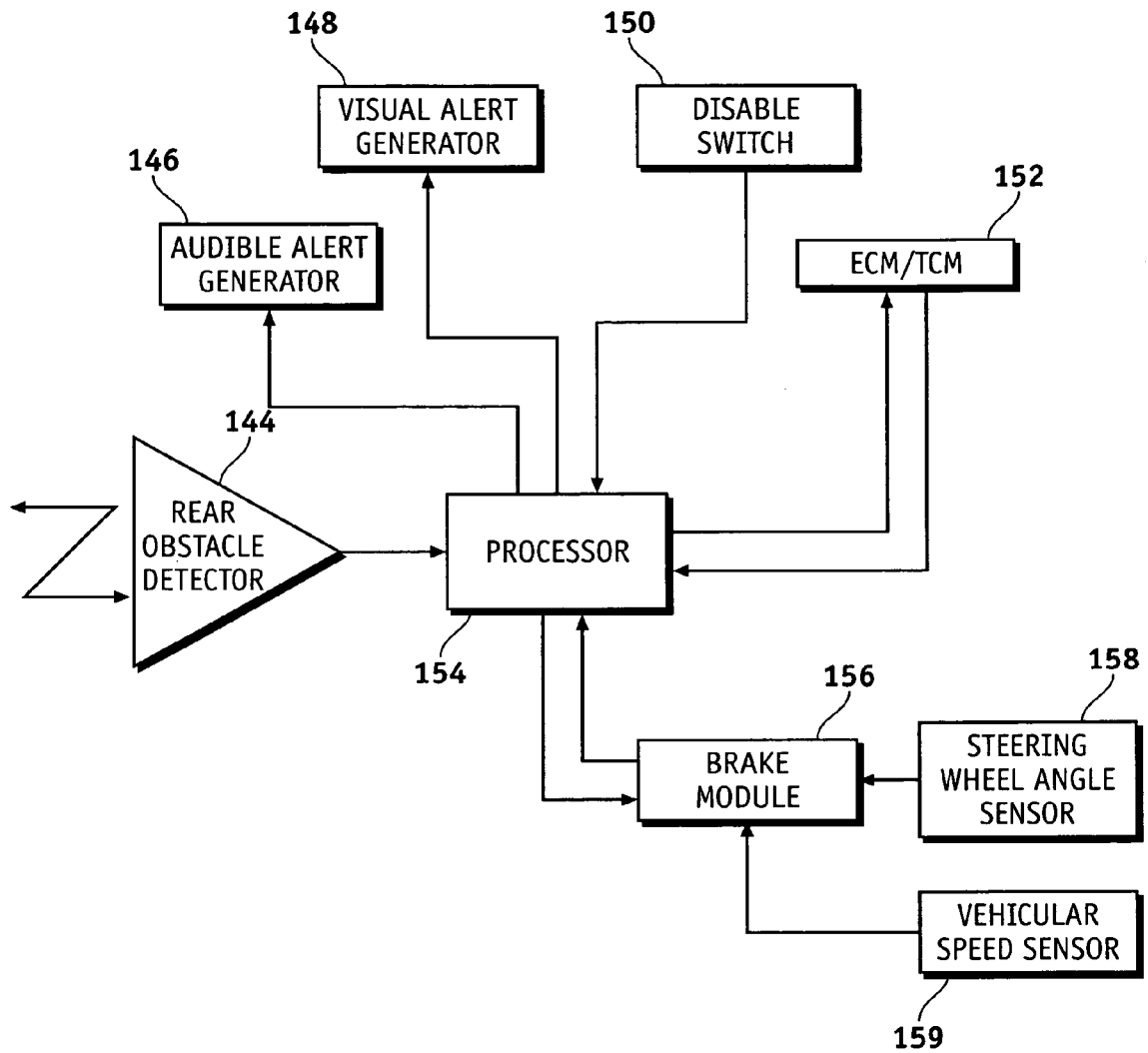
FIG. 4 is a functional block diagram of an exemplary embodiment of the inventive rear obstacle detection and avoidance system.

FIG. 4 is a functional block diagram of an ROA system 142 in accordance with an exemplary embodiment of the present invention. ROA system 142 comprises a rear obstacle detector 144, an audible alert generator 146 (e.g., a chime module), a visual alert generator 148 (e.g., a rear display), a disable switch 150, an engine and transmission control module (ECM/TCM) 152, a central processor 154, a brake system or brake module 156, a steering wheel angle sensor 158, and a vehicle speed sensor 159. As can be seen in FIG. 4, central processor 154 has first, second, and third inputs coupled to the outputs of rear obstacle detector 144, disable switch 150, and ECM/TCM 152, respectively. Processor 154 also includes first and second outputs coupled to the inputs of visual alert generator 148 and audible alert generator 146, respectively. Brake module 156 has first, second, and third inputs coupled to the outputs of steering wheel angle sensor 158, speed sensor 159, and central processor 154, respectively. Brake module 156 also includes an output that is coupled to a fourth input of central processor 154.

Though not shown in FIG. 4, a rearward looking camera may also be included in system 142. The camera may be coupled to processor 154 and a display and provide a driver of vehicle 100 with images of the rearward path and rear obstacles present therein in the well-known manner. Equipping system 142 with a rearward looking camera in this manner may further increase the likelihood that a driver will take appropriate actions to avoid a collision with a rear obstacle.

ROA system 142 utilizes data indicating (1) the distance at which rear obstacles are detected by rear obstacle detector 144, (2) the current speed of the vehicle generated by brake module 156, (3) the gear in which the vehicle is presently operating in from ECM/TCM 152, and (4) whether the system is enabled (i.e., whether the system is switched on) from disable switch 150. This information is processed in accordance with the speed vs. distance functions shown in FIG. 3 to determine which, if any, rear obstacle avoidance actions should be taken. Processor 154 also may utilize the current position of the steering wheel (as indicated by steering wheel angle sensor 158) and any other relevant data (e.g., vehicle yaw rate) to determine one or more projected rearward paths of the vehicle to be monitored by rear obstacle detector 144 for rear obstacles.

Figure 5:
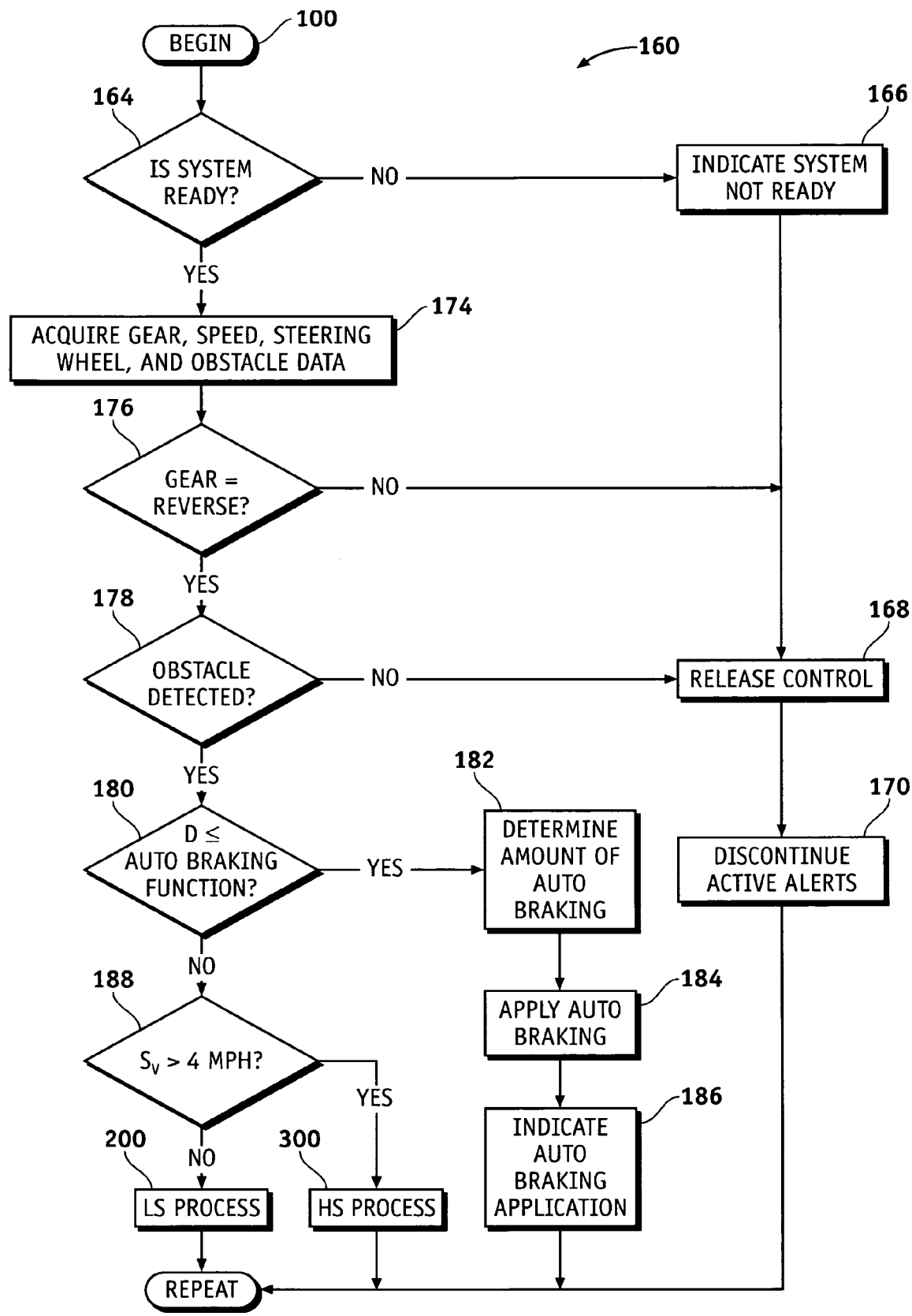
FIGS. 5-7 are flowcharts illustrating the operation of the rear obstacle detection and avoidance system shown in FIG. 4.
Figure 6:
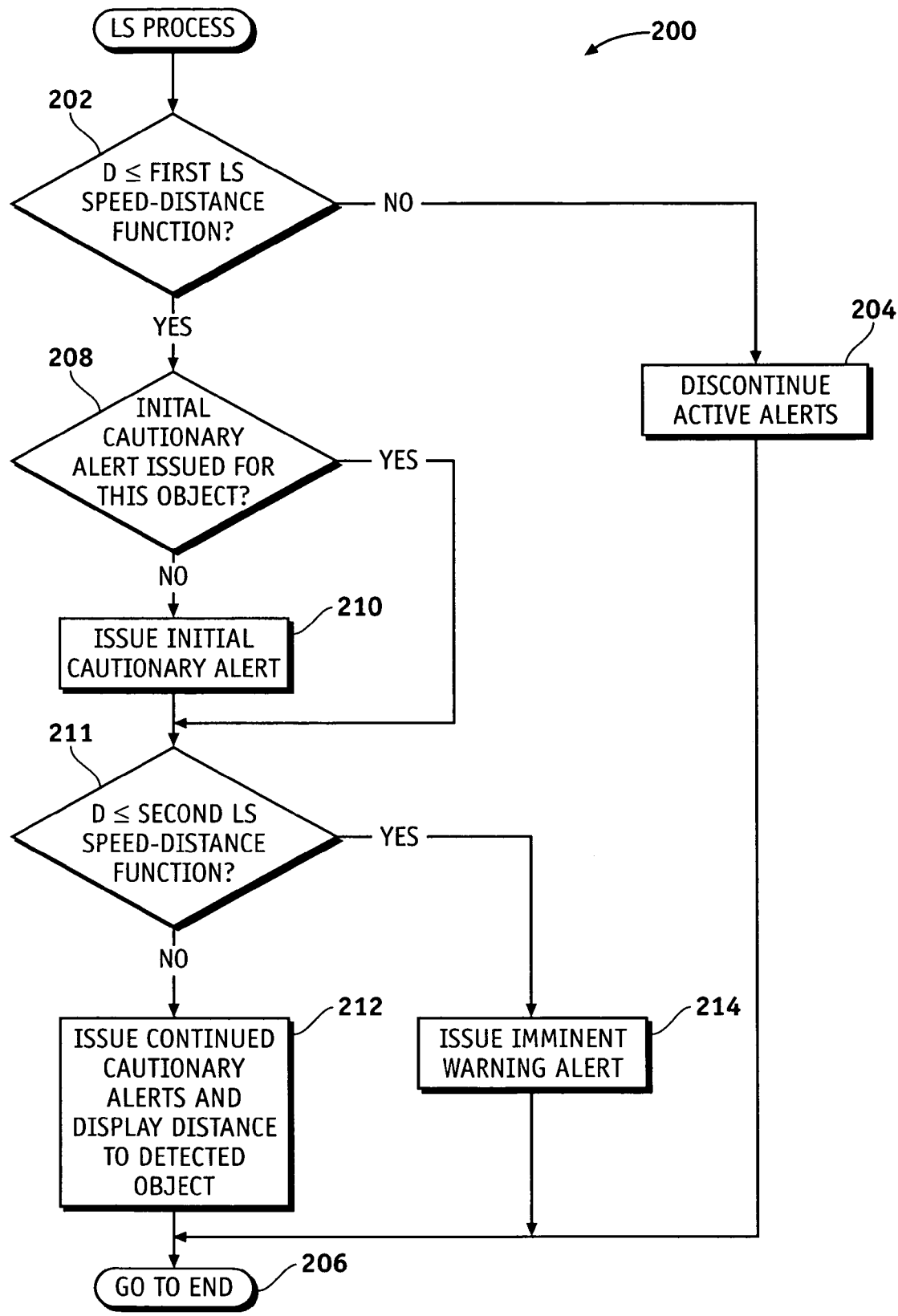
Figure 7:
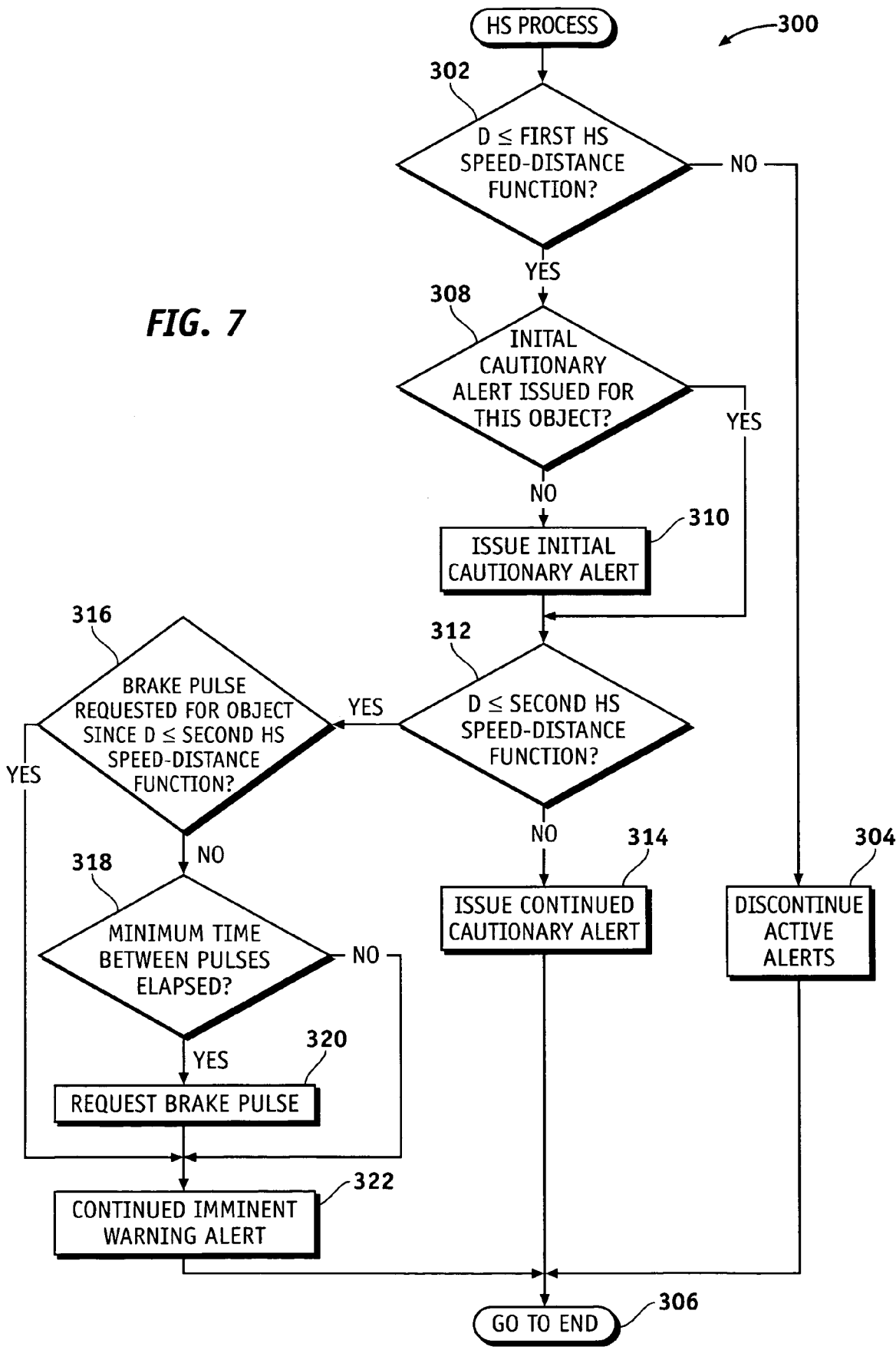

FIGS. 5 through 7 illustrate an exemplary process that may be used by processor 154 to perform various ROA actions such as those described previously in connection with FIGS. 1 through 3. Process 160, shown in FIG. 5, provides the starting and ending point for a single iteration of the process described subsequently. Low speed process 200 (FIG. 6) and higher speed process 300 (FIG. 7) are called at STEPS 200 and 300 of process 160 and respectively correspond to low speed range 134 and higher speed range 136 of graph 120 (FIG. 3). It should be remembered during the following discussion that process 160 is repeated during any given reverse maneuver. For example, processor 154 may repeat process 160, and possibly process 200 or process 300, every 40 milliseconds. Thus, these processes may be performed many times during a single reverse maneuver.

Referring now to FIGS. 3 through 5, process 160 begins at STEP 164 wherein processor 154 determines if the ROA system is ready for use by, for example, establishing that all relevant components are properly working and that the system has not been disabled by a user via disable switch 150. If the system is not ready, an indication is generated at STEP 166 (e.g., a visual alert such as the text SYSTEM NOT READY). A control that may have been previously exercised by the ROA system (e.g., automatic braking) is released at STEP 168, and any alerts currently being generated by audible alert generator 148 or visual alert generator 146 are discontinued at STEP 170. If, instead, the system is determined to be ready at STEP 164, the process moves to STEP 174. Data regarding the current gear, vehicle speed, steering wheel angle, and any detected obstacles is gathered from ECM/TCM 152, speed sensor 159 (via brake module 156); steering wheel angle sensor 158 (again via brake module 156), and rear obstacle detector 144, respectively. As will be described in greater detail below, the data gathered in STEP 174 is used in various subsequent steps of process 160 to determine the appropriate actions to perform.

Processor 154 next determines whether the vehicle upon which ROA system 142 is deployed is currently in reverse (STEP 176). If the vehicle is not currently in reverse, the process moves on to STEP 168 and proceeds as described in the paragraph above. If the vehicle is currently in reverse, the process moves to STEP 178 wherein it determines from the data acquired from rear obstacle detector 144 whether one or more rear obstacles have been detected in the rearward path of vehicle 100. If no rear obstacles have been detected, the process again proceeds to STEP 168. If, however, one or more rear obstacles have been detected in the rearward path of vehicle 100, the process advances to STEP 180. In STEP 180, processor 154 compares current data indicating the distance to one or more detected rear obstacles and the vehicle's speed, both retrieved earlier in STEP 174, to speed vs. distance function 128 of graph 120 (FIG. 3). If this data falls above speed vs. distance function 128, the process moves on to STEP 188 and no automatic braking is applied. In contrast, if the data falls on or below speed vs. distance function 128, an appropriate amount of braking force will be determined considering vehicle speed and the detected distance and applied in STEPS 182 and 184, respectively. An automatic braking indicator will also be generated at STEP 186 by, for example, displaying a message. Additionally or alternatively, it may be desirable to issue an imminent alert as described previously; this will ensure that if the currently detected obstacle was not previously detected at a distance above function 128, an imminent alert is generated. Lastly, as will be appreciated by those skilled in the art, it may also be desirable to manipulate (e.g., disengage) the throttle of the vehicle before or while applying automatic braking in this manner.

If, at STEP 180, it is determined that automatic braking should not be applied, the processor moves to STEP 188 wherein the vehicle's current speed is compared to a predetermined value, referred to hereinabove as the threshold speed, to determine whether low speed mode analysis (i.e., low speed process 200) or higher speed mode analysis (i.e., higher speed process 300) should occur. As previously suggested and indicated at STEP 188, the threshold speed is preferably set at approximately 4 mph. Thus, if it is determined that the vehicle's current speed is less than or equal to 4 mph, the process will advance to low speed process 200 shown in FIG. 6.

Referring now to FIG. 6 in addition to FIGS. 2 through 5, low speed process 200 is particularly suited for warning a driver of rear obstacles during low speed parking maneuvers, such as that illustrated by FIG. 1. In STEP 202 of process 200, the process determines if the current detected distance (i.e., the distance between the vehicle and a detected obstacle) is less than or equal to the distance defined by function 125 (i.e., 2.5 meters). If the detected distance is greater than this distance, processor 154 discontinues any alerts presently active at STEP 204 before reaching GO TO END 206, which directs processor to END 172 (FIG. 5). If, however, processor 154 determines that the detected distance is in fact less than or equal to this distance, the process asks if an initial cautionary alert has yet been generated for this object at STEP 208. If an alert has been generated, the process skips STEP 210 and moves to STEP 211. If an alert has not been generated, the process issues an initial cautionary alert (STEP 210) before proceeding to STEP 211.

In STEP 211 of process 200, the process determines if the current detected distance is less than or equal to the distance on speed vs. distance function 126 (FIG. 3) corresponding to the vehicle's current speed. If the detected distance is not, the process moves to STEP 212 wherein a continued cautionary alert is issued. The alert may be displayed on a display by visual alert generator 148. In addition, the distance separating the detected obstacle from vehicle 100 may also be displayed. If, however, processor 154 determines that the detected distance is in fact less than or equal to the distance on speed vs. distance function 126 corresponding to the current speed of vehicle 100 (FIG. 3), the process moves to step 214 wherein an imminent alert is generated. This alert may be a visual alert generated by alert generator 148 and/or an audible alert (e.g., a continuous series of chimes) produced by audible alert generator 146.

Focusing once again on STEP 188 of process 160 (FIG. 5), if it is determined vehicular speed exceeds the threshold speed of 4 mph, the process advances to higher speed process 300, which is expanded upon in FIG. 7. In higher speed process 300, processor 154 first determines at STEP 302 if the distance between a detected obstacle and the vehicle is less than or equal to a distance on speed vs. distance function 130 corresponding to a given vehicular speed as shown in graph 120 (FIG. 3). If it is not, the process discontinues any active alerts in STEP 304 before reaching GO TO END 306, which directs processor 154 to END 172 of process 160 (FIG. 5). If the detected distance is less than or equal to the distance of speed vs. distance function 130 corresponding to the vehicle's current speed, however, the process instead progresses to STEP 308 wherein it is determined whether an initial cautionary alert has been issued. If such an alert has been issued, the process moves to STEP 312. If such an alert has not been issued, processor 154 causes the alert to be issued via audible alert generator 146 and/or visual alert generator 148 before advancing to STEP 312.

In STEP 312 of higher speed process 300, processor 154 determines whether the detected distance is less than or equal to the distance on speed vs. distance function 132 corresponding to the current vehicular speed as illustrated in graph 120 of FIG. 3. If the detected distance is greater than speed vs. distance function 132 at the current vehicular speed, processor 154 commands audible alert generator 146 and/or visual alert generator 148 to issue a continued cautionary alert at STEP 314 before advancing to GO TO END 306. If, instead, the detected distance is less than or equal to speed vs. distance function 132, processor 154 advances to STEP 316. STEPS 316, 318, and 320 operate to create discrete haptic alerts, specifically brake pulses. First, at STEP 316, the process determines if a brake pulse has been requested from brake module 156 (FIG. 4) for a given obstacle since the detected distance became less than or equal to the distance on speed vs. distance function 132 corresponding to the current speed of the vehicle. If a brake pulse has been requested, the process progresses to STEP 322 resulting in the generation of a continued imminent warning alert. The process then progresses to GO TO END 306. In contrast, if a brake pulse has not been requested, the process advances to STEP 318 for a determination as to whether a predetermined time limit has elapsed since the last brake pulse was produced. If the time limit has not elapsed, the process moves to above-described STEP 322. If, instead, the time limit has elapsed, the process causes brake module 156 (FIG. 4) to generate a brake pulse before progressing to STEP 322. In this way, a first brake pulse issued in response to a first detected obstacle and a second brake pulse issued in response to a second detected obstacle may be sufficiently temporally offset to ensure that a driver of vehicle 100 is able to distinguish the first pulse from the later.

It should thus be appreciated from the foregoing that there has been provided a rear obstacle avoidance system configured to alert a driver of rear obstacles and the likelihood of collision therewith during both low speed and higher speed reverse maneuvers. It should further be appreciated that a system has been provided that is configured to automatically disengage the throttle and apply the appropriate amount of braking force immediately prior to a rear obstacle collision becoming unavoidable. Though the embodiments of the inventive ROA system have been described hereinabove as having only a low speed and a higher speed operation mode, it should be appreciated that any practicable number of modes may be employed. Lastly, although the embodiment of the ROA system was described previously as configured to undertake obstacle avoidance actions during reverse maneuvers only, it should be appreciated that the principles described herein are equally applicable to a system configured to undertake obstacle avoidance actions during forward-traveling maneuvers as well.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A rear obstacle detection and avoidance system for use on a vehicle, the system comprising:
    a rear obstacle detector coupled to the vehicle for measuring the distance between the vehicle and an obstacle substantially to the vehicle's rear;
    a speed sensor for determining vehicle speed;
    an alert generator for notifying an occupant of the vehicle of a rear obstacle; and
    a processor coupled to said rear obstacle detector, said speed sensor, and said alert generator, said processor for causing the generation of (i) a first alert when the speed of the vehicle is less than a threshold speed and said distance is less than a first distance related to a first function of speed vs. distance wherein distance varies as a function of speed below the threshold speed, and (ii) a second alert when the speed of the vehicle is greater than said threshold speed and said distance is less than a second distance related to a second function of speed vs. distance.

2. A rear obstacle detection and avoidance system according to claim 1 wherein said processor further causes a third alert to be generated when the speed of the vehicle is greater than said threshold speed and said distance is less than a third distance related to a third function of speed vs. distance.

3. A rear obstacle detection and avoidance system according to claim 2 wherein at least one of said first, said second, and said third alerts comprises a visual alert.

4. A rear obstacle detection and avoidance system according to claim 2 wherein said processor further causes a fourth alert to be generated when the speed of the vehicle is less than said threshold speed and said distance is less than a predefined distance.

5. A rear obstacle detection and avoidance system according to claim 3 wherein the vehicle includes a rear windshield and wherein said visual alert is generated on a display proximate the rear windshield of the vehicle.

6. A rear obstacle detection and avoidance system according to claim 2 wherein at least one of said first, said second, and said third alerts comprises an audible alert.

7. A rear obstacle detection and avoidance system according to claim 6 wherein a characteristic of said audible alert varies in relation to said distance.

8. A rear obstacle detection and avoidance system according to claim 2 wherein at least one of said first, said second, and said third alerts comprises a haptic alert.

9. A rear obstacle detection and avoidance system according to claim 8 wherein said haptic alert is a brake pulse.

10. A rear obstacle detection and avoidance system according to claim 1 wherein the vehicle includes a brake system and wherein said processor is coupled to the brake system for causing the brake system to reduce the speed of the vehicle when said distance is less than a third distance determined in accordance with a third function of speed vs. distance.

11. A rear obstacle detection and avoidance system according to claim 1 wherein said rear obstacle detector comprises a radar system.

12. A rear obstacle detection and avoidance system according to claim 1 wherein said threshold speed is approximately 4 mph.

13. A rear obstacle detection and avoidance system for use on a vehicle having a brake system, the system comprising:
    a rear obstacle detector coupled to the vehicle for measuring the distance between the vehicle and an obstacle substantially to the vehicle's rear;
    a speed sensor for determining vehicle speed;
    an alert generator for notifying an occupant of the vehicle of a rear obstacle; and
    a processor coupled to said rear obstacle detector, said speed sensor, and said alert generator, said processor for (i) generating at least a first type of alert when the speed of the vehicle is less than a threshold speed and said distance is less than a first distance determined in accordance with a first function of speed vs. distance wherein distance varies as a function of speed below the threshold speed; (ii) generating at least a second type of alert when the speed of the vehicle is greater than said threshold speed and said distance is less than a second distance determined in accordance with a second function of speed vs. distance; and (iii) causing the brake system to reduce the speed of the vehicle when said distance is less than a third distance determined in accordance with a third function of speed vs. distance, the third function of speed vs. distance converging with the first function of speed vs. distance as the vehicle's speed approaches zero miles per hour.

14. A rear obstacle detection and avoidance system according to claim 13 wherein said processor further causes at least a third type of alert to be generated when the speed of the vehicle is more than said threshold speed and said distance is less than a fourth distance related to a fourth function of speed vs. distance.

15. A rear obstacle detection and avoidance system according to claim 14 wherein at least one of said first, said second, and said third alerts comprises a haptic alert.

16. A rear obstacle detection and avoidance system according to claim 15 wherein said haptic alert is a brake pulse.

17. A method for detecting and avoiding obstacles behind a vehicle when the vehicle is being operated in reverse, the vehicle including brakes, the method comprising:
   detecting the distance between an obstacle and the rear of the vehicle;
   measuring the speed of the vehicle; and,
   generating a first alert when the speed of the vehicle is less than a threshold speed and the distance is less than a first distance determined in accordance with a first function of speed vs. distance; and
   temporarily applying the vehicle brakes to produce a brake pulse when the speed of the vehicle is greater than the threshold speed and the distance is less than a second distance determined in accordance with a second function of speed vs. distance.

18. A method according to claim 17 wherein the step of generating further comprises generating a second alert when the speed of the vehicle is more than the threshold speed and the distance is less than a third distance related to a third function of speed vs. distance.

19. A method according to claim 18 wherein the vehicle includes a throttle, the method further comprising:
   disengaging the throttle of the vehicle; and
   braking the vehicle when the distance is less than a fourth distance related to a fourth function of speed vs. distance.

* * * * *